July 10, 1951 — C. F. BLOCK — 2,560,271
CUTTING GAUGE
Filed Oct. 4, 1950
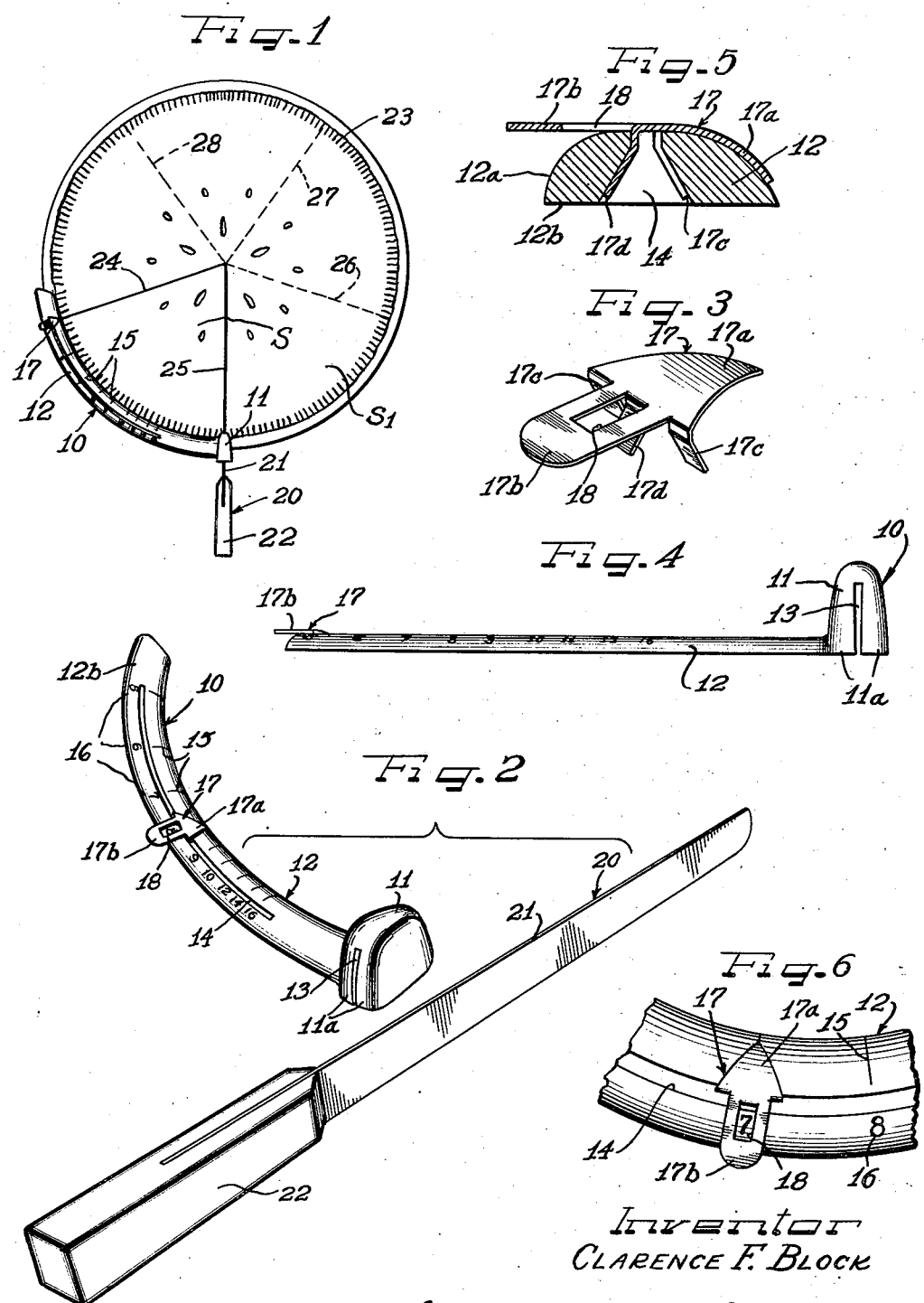
Inventor
CLARENCE F. BLOCK

Patented July 10, 1951

2,560,271

UNITED STATES PATENT OFFICE 2,560,271

CUTTING GAUGE

Clarence F. Block, Barrington, Ill., assignor to C. F. Block & Associates, Chicago, Ill., a partnership Application October 4, 1950, Serial No. 188,453

4 Claims. (Cl. 30—114)

This invention relates to an inexpensive device for gauging the cutting of circular objects into segments of desired size. Specifically, the invention deals with a cutting gauge attachable to a knife for dividing a circular cake or pie into the desired number of equal pieces.

In accordance with this invention, there is provided a measuring device or gauge attachable to the blade of a knife adjacent the knife handle to extend laterally therefrom preferably along an arcuate path. The extending portion of the gauge carries a slide and is equipped with indicia. In order to cut a pie or cake into the desired number of equally sized segments or pieces, a starting cut is first made with the knife from the center to the periphery of the pie or cake along a radius line. The slide is then positioned on the gauge in alignment with the indicia indicating the number of pieces into which the pie or cake is to be cut. The thus set slide is then aligned with the initial radial cut and the knife will then be automatically positioned for the next radial cut. The operation is repeated by successively positioning the slide in alignment with the new cut and the cake or pie will thereupon be uniformly divided into the number of pieces indicated by the indicia aligned with the slide.

The cutting gauge of this invention is preferably composed of a hard but inherently resilient plastic material, so that it can be snapped onto and off of the cutting knife.

It is, then, an object of this invention to provide a gauge or measuring device that is readily attachable to a knife or cutter for gauging cutting operations to produce a desired number of equal sized segments from a circular object.

A further object of this invention is to provide a cake or pie cutting gauge attachable to a knife and having indicia thereon to be aligned with a preformed cut in the pie or cake to position the knife for cutting a segment that will be equivalent in size to the fraction of the whole pie or cake shown by the indicia.

A further object of the invention is to provide a pie or cake cutting gauge adapted to be snapped onto the blade of the cutting knife and extend laterally therefrom along an arcuate path and equipped along its length with indicia showing the number of pieces of equal size to be cut from the cake or pie when the indicia is aligned with an initial radial cut in the pie or cake.

A still further object is to provide an inexpensive circular pie or cake cutting gauge having a head portion adapted to be snapped onto a knife and an arcuate shank portion slidably supporting an arrow and marked with indicia along its length showing the number of pieces of equal size that will be cut from a cake or pie when the arrow aligned with the indicia is positioned successively opposite the last cut in the cake or pie.

A still further object of the invention is to provide a pie cutter gauge insuring the division of a pie into a desired number of equal segments.

Other and further objects of the invention will be apparent to those skilled in the art from the following detailed description of the annexed sheet of drawings which, by way of preferred example only, illustrates one embodiment of the invention.

On the drawings:

Figure 1 is a top plan view illustrating the cutting of a circular pie into segments measured by the cutting gauge of this invention.

Figure 2 is a perspective view of the cutting gauge of this invention and a knife in position for receiving the gauge thereon.

Figure 3 is a perspective view on an enlarged scale of the sliding arrow for the gauge.

Figure 4 is a side elevational view of the gauge.

Figure 5 is a transverse cross-sectional view taken through the sliding arrow and the shank of the cutting gauge.

Figure 6 is an enlarged fragmentary plan view of the arrow and shank of the gauge.

As shown on the drawings:

The cutting gauge 10 of this invention has a head 11 and a laterally extending arcuate shank 12 preferably with a transversely convex top face 12a and a flat bottom 12b. The head 11 has a slot 13 extending inwardly from the bottom edge thereof into spaced relation from the top edge and increasing in width as it approaches the top. The slot extends through the front and back faces of the head and divides the head into a pair of opposed jaws 11a.

The gauge 10 is preferably composed of plastic material having self-sustaining rigid properties but possessing an inherent resiliency enabling the jaws to be spread apart under load without breakage of the head. Plastics such as vinyl butyral resins, methyl methacrylate, polystyrene, and styrene copolymer type resins are especially suitable.

The arcuate shank 12 is preferably less than a quarter circle arc and is preferably struck on a 4½ inch radius to best accommodate the gauging of circular pies and cakes from 8 to 10 inches in diameter. When the shank 12 embraces the peripheral edge of such a cake or pie, the knife blade secured in the head 11 will be positioned along a radial line of the cake or pie.

The shank 12 has a slot 14 extending parallel with its sides intermediate the ends thereof. This slot 14, as best shown in Figure 5, converges from the flat bottom 12b of the shank to a narrow gap at the convex top 12a of the shank.

Radial guide lines 15 are provided in spaced transverse relation along the forward edge of the shank 12 and each guide line has a digit 16 transversely aligned therewith on the rear side of the top wall of the shank. Since this top wall 12b is convex, the guide line 15 and the digits 16 are readily visible throughout a wide angle. The digits 16 indicate the number of equal sized segments that can be cut from a circular object when the gauge is used as directed.

An indicator 17 in the form of an arrow is slidably mounted on the shank 12 and includes an arrow head 17a overlying the forward side of the top wall 12b so that its pointed end can be easily aligned with any one of the guide lines 15. The shaft 17b of the arrow indicator overlies the rearward portion of the shank containing the digits 16.

As best shown in Figure 3, the rear end of the arrow head 17a has downturned tabs 17c sloping toward the point of the arrow head. A tab 17d is cut from the central area of the shaft portion 17b and bent downwardly along the same bend line as the tabs 17c but sloping toward the rear end of the shaft portion. A window 18 is thereby provided through the shaft portion adjacent the large end of the arrow head.

As best shown in Figure 5, the tabs 17c and 17d project into the slot 14 from the convex top 12a of the shank. The tabs 17c extend in a forward direction toward the front face of the shank to follow the diverging contour of the adjacent wall of the groove. The tab 17d slopes toward the rear face of the shank to follow the oppositely inclined contour of the opposite wall of the slot. Since the tabs 17c and 17d diverge along oppositely inclined paths into engagement with the oppositely inclined side walls of the slot 14, the indicator 17 will be retained on the shank 12 in slidable relation therewith.

When the arrow is mounted on the shank 12 as indicated in Figure 5, the window 18, as best shown in Figure 6, will overlie the line of the digits 16 to be selectively positioned above a digit.

As shown in Figures 1 and 2, a knife 20 is provided for receiving the gauge. The knife has a blade 21 and a handle 22 at one end of the blade. The head 11 of the gauge, as illustrated in Figure 2, is disposed over the dull edge of the blade 21 to receive the blade in the slot 13 with the jaws 11a clamped tightly against the side faces of the blade. The bottom of the slot 13 is easily bottomed on the top or dull edge of the blade and the jaws will cooperate with this bottom to hold the shank portion 12 of the gauge in a rigid laterally extending relation to the blade. The shank will lie along an arc struck from a radius and center that is intersected by the knife blade. In other words, the head 11 holds the knife blade 22 along a radius line of the shank arc. The head 11 is preferably positioned on the blade 21 close to the handle 22 to carry the shank at the periphery of the circular object being cut.

As shown in Figure 1, the cutting of a circular object 23, such as a pie or cake, into the desired number of radial segments of equal size is easily accomplished with the use of the gauge 10 by first using the blade 21 of the knife to form an initial radial cut 24 from the center to the periphery of the object 23. The arrow indicator 17 is then set on the gauge to position the window 18 over the digit indicating the desired number of equal sized segments to be cut from the object. As illustrated in Figure 1, the indicator is set so that the window will be disposed over the digit numbered 5 on the shank 12. In this position, the arrow point will be aligned with the particular radial line 15 for positioning the knife for the next cut. The arrow point is then aligned with the cut 24 and the shank 12 of the gauge is positioned to embrace or extend around the periphery of the circular object 23 to position the blade 21 of the knife for the next radial cut 25. The segment S between the cuts 24 and 25 will be equivalent in size to one-fifth of the circular object. To form the next segment, the arrow is aligned with the cut 25 and the gauge will thereupon automatically position the knife to make the cut 26. A second segment $S_1$ of the same size as segment S will be formed between the cuts 25 and 26. The operation is repeated to produce cuts 27 and 28 whereupon the circular object 23 is divided into five equal segments.

In an identical manner, any number of equal sized segments in excess of five can be formed by setting the arrow so that its window will register with the digits on the shank indicating the number of pieces to be cut. As shown, the digits provide for five to sixteen pieces.

From the above descriptions it will therefore be evident that the invention provides an inexpensive cutting gauge that is readily snapped onto any flat bladed knife or cutter to extend laterally therefrom in an arcuate path so that a marker on the gauge can be aligned with a previously formed cut in a pie or cake to produce the desired number of equal sized pieces of the pie or cake.

It will be understood that modifications and variations may be effected without departing from the scope of the novel concepts of the present invention.

I claim as my invention:

1. A cutting gauge for circular pies and cakes which comprises a member having a slotted head adapted to be mounted on the blade of a knife in fixed frictional engagement therewith, a shank extending laterally from said head along an arcuate path, a longitudinal groove through said shank, marking indicia at spaced intervals on said shank along the length of the groove, and an indicator slidably mounted on said shank and in said groove for coacting with said indicia.

2. A pie cutting gauge comprising a molded plastic member having a head at one end adapted to be snapped onto the blade of a knife, a shank extending laterally from said head along an arcuate path, said shank having a convex top wall, a longitudinal groove through said shank intermediate the ends thereof, a marker having tabs slidably mounted in said groove and a pointer portion overlying the convex face of the shank, and indicia on said shank showing the number of pieces of pie to be cut when the marker is aligned therewith.

3. A pie cutting gauge which comprises a member having a knife blade-receiving head portion and a laterally extending arcuate shank portion with a transversely convex top face, a longitudinal groove in said shank portion diverging from a narrow gap in said top face thereof, a marker disposed over said top face of the shank portion and having tabs depending therefrom into sliding engagement with the diverging side walls of the groove for retaining the marker on the shank, said marker having a window therein, and spaced digits on the shank adapted to be framed by said window for indicating the nmber of pieces to be cut from the pie.

4. A device adapted for gauging the cutting of circular objects into a desired number of segments which comprises a member having a head portion adapted to be mounted on a knife, a shank extending laterally from said head portion along an arcuate path, said shank having a longitudinal groove therethrough diverging from a narrow gap in the top face of the shank, a marker disposed over said top face of the shank having tabs depending therefrom into sliding engagement with the diverging side walls of the groove for retaining the marker on the shank, and indicia on said shank adapted to coact with said marker for indicating the number of segments to be cut from a circular object when the marker is aligned therewith and with a preformed radial cut in the circular object.

CLARENCE F. BLOCK.

REFERENCES CITED

The following references are of record in the file of this patent:

UNITED STATES PATENTS

| Number | Name | Date |
|---|---|---|
| 912,469 | Hagglund | Feb. 16, 1909 |
| 2,471,466 | Weinberg | Nov. 5, 1947 |